(12) United States Patent
Szigeti et al.

(10) Patent No.: US 12,596,601 B1
(45) Date of Patent: Apr. 7, 2026

(54) FULL-STACK APPLICATION EXPERIENCE DOMAIN TROUBLESHOOTING

(71) Applicant: Cisco Technology, Inc., San Jose, CA (US)

(72) Inventors: Thomas Szigeti, Vancouver (CA); David John Zacks, Vancouver (CA); Walter Theodore Hulick, Jr., Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/906,571

(22) Filed: Oct. 4, 2024

(51) Int. Cl.
| | |
|---|---|
| *G06F 11/00* | (2006.01) |
| *G06F 11/07* | (2006.01) |
| *H04L 41/0677* | (2022.01) |
| *H04L 43/091* | (2022.01) |

(52) U.S. Cl.
CPC ...... *G06F 11/0754* (2013.01); *G06F 11/0709* (2013.01); *H04L 41/0677* (2013.01); *H04L 43/091* (2022.05)

(58) Field of Classification Search
CPC ............. G06F 11/0754; G06F 11/0709; H04L 43/091; H04L 41/0677
See application file for complete search history.

(56) References Cited

U.S. PATENT DOCUMENTS

| | | | | |
|---|---|---|---|---|
| 7,822,837 | B1 | 10/2010 | Urban et al. | |
| 11,323,312 | B1 * | 5/2022 | Banka | H04W 28/0268 |
| 11,797,366 | B1 * | 10/2023 | Ross | H04L 41/069 |
| 12,360,878 | B1 * | 7/2025 | Vippagunta | G06F 11/3612 |
| 12,443,460 | B2 * | 10/2025 | Tav | G06F 9/5077 |
| 2011/0055470 | A1 | 3/2011 | Portolani | |
| 2012/0278477 | A1 | 11/2012 | Terrell et al. | |
| 2017/0373950 | A1 | 12/2017 | Szilagyi et al. | |
| 2023/0022959 | A1 * | 1/2023 | Dasgupta | H04L 41/5025 |
| 2024/0007366 | A1 | 1/2024 | Mermoud et al. | |
| 2025/0225058 | A1 * | 7/2025 | Mulvihill | G06F 11/366 |

OTHER PUBLICATIONS

K. Ramakrishnan, The Addition of Explicit Congestion Notification (ECN) to IP, TeraOptic Networks, Sep. 2001, pp. 1-63.

* cited by examiner

*Primary Examiner* — Jason B Bryan
(74) *Attorney, Agent, or Firm* — Lee & Hayes, P.C.

(57) ABSTRACT

In one embodiment, a method herein comprises: determining, by a service mesh process, whether a problematic metric for an application is based on a transport network to a cloud infrastructure or is within the cloud infrastructure; delineating, in response to the problematic metric being within the cloud infrastructure, cloud infrastructure network contribution versus application microservice architecture contribution to the problematic metric; determining, in response to the application microservice architecture contribution being a primary contributor to the problematic metric as compared to the cloud infrastructure network contribution, whether the problematic metric is due to a software issue or a hardware issue of the cloud infrastructure, a high load issue with application microservices of the cloud infrastructure for the application, or else an issue with the application itself; and exporting a corresponding determination related to whether the problematic metric is due to the transport network, the cloud infrastructure, or the application itself.

20 Claims, 9 Drawing Sheets

310 ~ Agent 1

310 ~ Agent 2

310 ~ Agent 3

310 ~ Agent 4

300

320

Controller

Visualization
System

350

340

Client Device

UI

330

FULL-STACK APPLICATION EXPERIENCE DOMAIN TROUBLESHOOTING

TECHNICAL FIELD

The present disclosure relates generally to computer networks, and, more particularly, to full-stack application experience domain troubleshooting.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In many instances, when an application is experiencing issues, such as when application experience drops below user expectations, then analysts are challenged with identifying the problem domain. Namely, is the cause the network? Or is it the cloud native infrastructure (e.g., Kubernetes, service mesh, APIs, etc.)? Or is the issue with the application itself? The more efficiently the analysts can demarcate the problem domain, the more efficiently the issue can be routed to the proper support team for root-cause analysis.

BRIEF DESCRIPTION OF THE DRA WINGS

The embodiments herein may be better understood by referring to the following description in conjunction with the accompanying drawings in which like reference numerals indicate identically or functionally similar elements, of which:

DESCRIPTION OF EXAMPLE EMBODIMENTS

Overview

According to one or more embodiments of the disclosure, full-stack application experience domain troubleshooting is provided herein. In one embodiment, an example method herein may comprise: determining, by a service mesh process, whether a problematic metric for an application is based on a transport network to a cloud infrastructure or is within the cloud infrastructure; delineating, by the service mesh process and in response to the problematic metric for the application being within the cloud infrastructure, cloud infrastructure network contribution versus application microservice architecture contribution to the problematic metric; determining, by the service mesh process and in response to the application microservice architecture contribution being a primary contributor to the problematic metric as compared to the cloud infrastructure network contribution, whether the problematic metric is due to a software issue of the cloud infrastructure, a hardware issue of the cloud infrastructure, a high load issue with application microservices of the cloud infrastructure for the application, or else an issue with the application itself; and exporting, by the service mesh process, a corresponding determination related to whether the problematic metric is due to the transport network, the cloud infrastructure, or the application itself.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
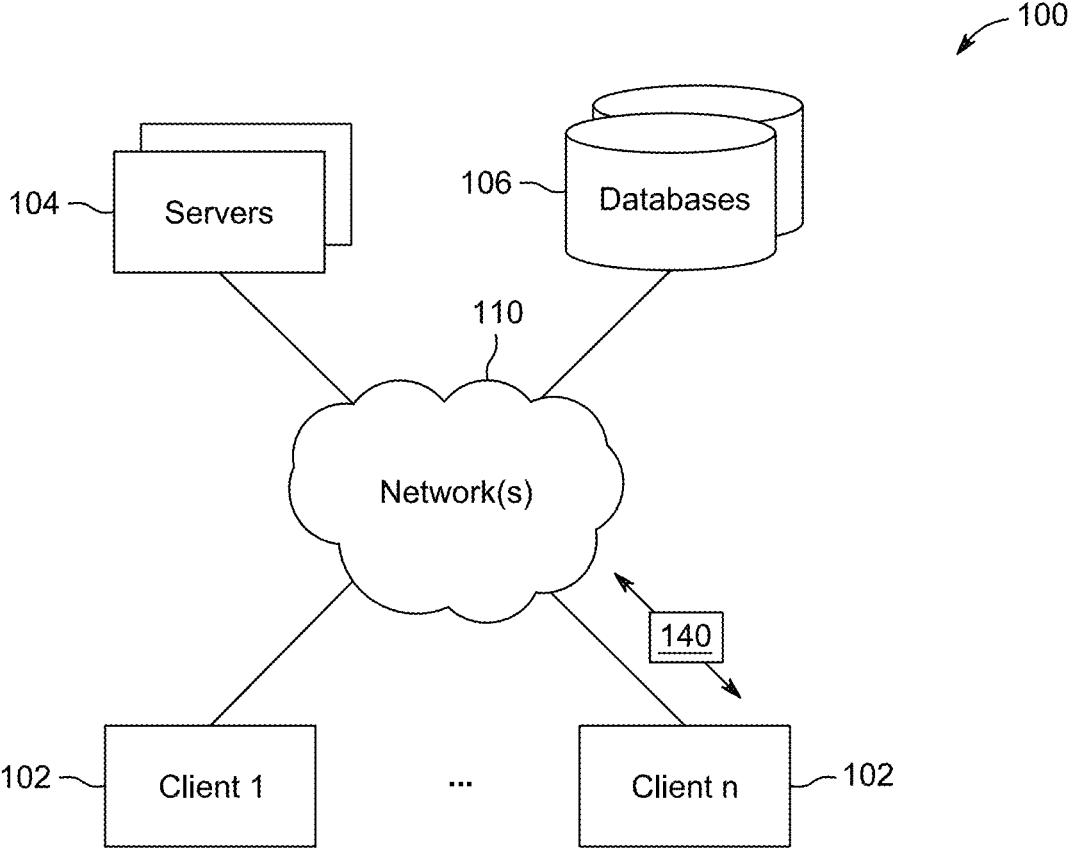
FIG. 1 illustrates an example computing system.

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to router a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
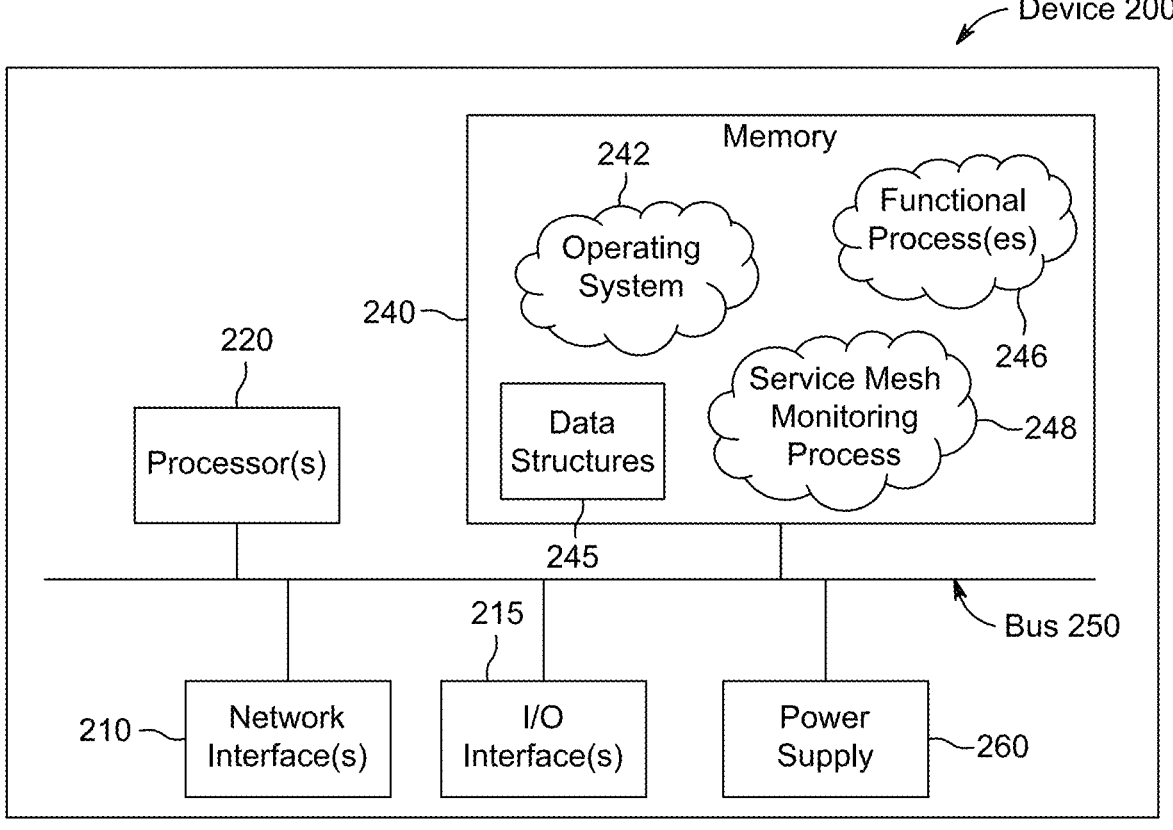
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a service mesh monitoring process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

Notably, the techniques herein may employ any number of machine learning techniques, such as to evaluate ingested data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various implementations, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable implementation of categorical classification.

Figure 3:
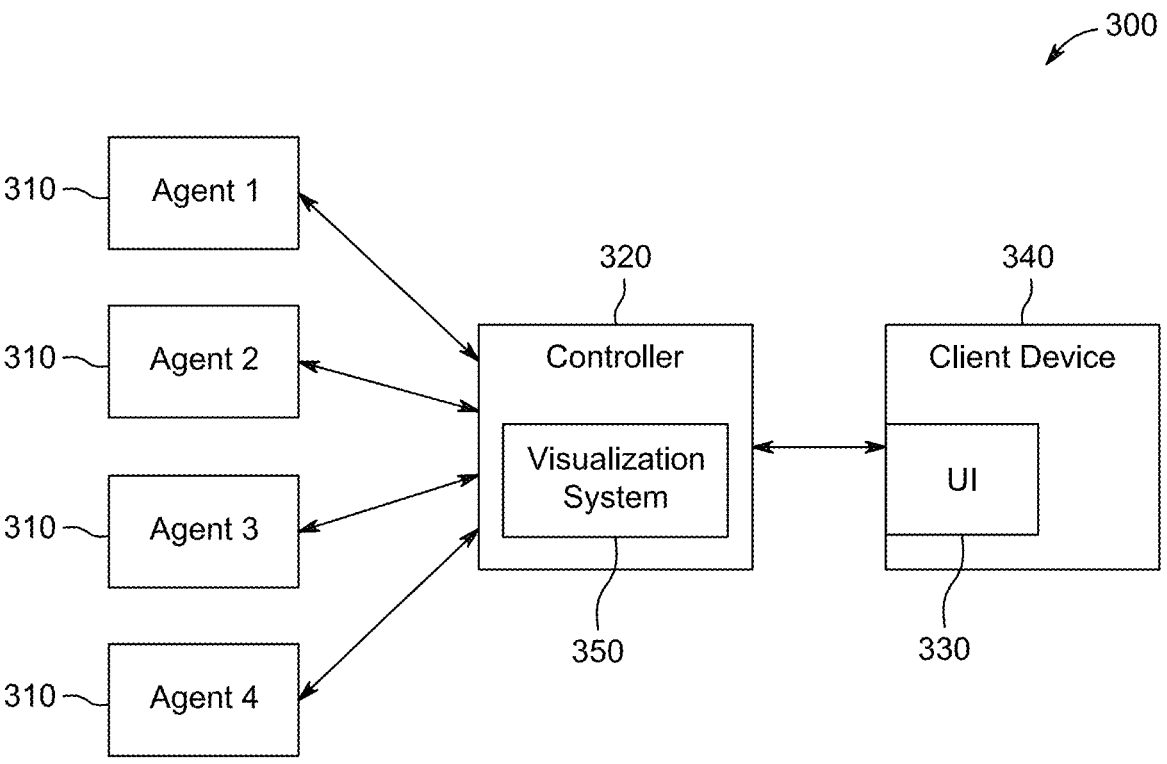
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (agents 310) and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform.

The controller 320 may serve a browser-based user interface (UI) (interface 330) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller instance may be installed locally and self-administered.

The controllers 320 receive data from different agents (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one implementation, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain implementations, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Full-Stack Application Experience Domain Troubleshooting—

As noted above, when an application is experiencing issues, such as when application experience drops below user expectations, then analysts are challenged with identifying the problem domain. That is, as mentioned above, the analysts often need to determine if the cause of the issue is the network, the cloud native infrastructure, or the application itself. The more efficiently the analysts can demarcate the problem domain, the more efficiently the issue can be routed to the proper support team for root-cause analysis.

Additionally, due to the time-lag between the triggering incident and when the actual troubleshooting process begins, the issue may no longer be manifest. Thus, when the analysts begin their troubleshooting tasks and check these respective domains for issues and faults, they may find none; at which point, they may simply close the case, as they have nothing to go on.

The techniques herein, therefore, provide for full-stack application experience domain troubleshooting, providing clear demarcation of problem domains to specific application flows spanning the network, the cloud native infrastructure, and the application. In particular, the techniques herein enhance monitoring solutions (e.g., for Kubernetes/service mesh) to provide better context and correlation of application performance issues. For instance, as described in greater detail below, the techniques herein may delineate whether network issues have occurred in the transport to the cluster or within it. Additionally, the techniques herein may intelligently and dynamically delineate application versus network issues (e.g., latency) within a cluster via synthetic probes, as well as by dynamic encapsulation of actual traffic flows. Moreover, as further described below, the techniques herein may also dynamically signal network devices of cloud infrastructure delay, loss, errors, and traffic-rates via in-band metadata, which does not require any new protocol support.

Specifically, according to one or more embodiments of the disclosure as described in detail below, an example method herein may comprise: determining, by a service mesh process, whether a problematic metric for an application is based on a transport network to a cloud infrastructure or is within the cloud infrastructure; delineating, by the service mesh process and in response to the problematic metric for the application being within the cloud infrastructure, cloud infrastructure network contribution versus application microservice architecture contribution to the problematic metric; determining, by the service mesh process and in response to the application microservice architecture contribution being a primary contributor to the problematic metric as compared to the cloud infrastructure network contribution, whether the problematic metric is due to a software issue of the cloud infrastructure, a hardware issue of the cloud infrastructure, a high load issue with application microservices of the cloud infrastructure for the application, or else an issue with the application itself; and exporting, by the service mesh process, a corresponding determination related to whether the problematic metric is due to the transport network, the cloud infrastructure, or the application itself.

Operationally, the techniques herein rely on the fact that not only does the cloud infrastructure layer sit neatly between the network and application layers of modern application technology stacks, but it can also generate rich metrics for telemetry and troubleshooting purposes. For both of these reasons, the cloud infrastructure layer is an optimal place to perform efficient demarcations of the network, cloud infrastructure, and application problem domains.

Notably, at a high-level, many cloud services are being implemented through containerized orchestrations, such as Kubernetes. Kubernetes (K8s) is an open-source system designed to automate the deployment, scaling, and management of containerized applications. It is maintained by a global community of contributors. Kubernetes organizes multiple computers, whether virtual or physical, into a cluster capable of running workloads in containers.

A service mesh is a software infrastructure that facilitates secure, observable, and managed communication between services within an application, commonly used in microservices architectures but applicable to any environment with complex networking. This dedicated layer handles service-to-service communications, often through containerized microservices.

In a service mesh, network proxies are paired with each service, forming the "data plane" that intercepts and processes calls between services. The "control plane" coordinates the proxies and provides APIs for operations teams to monitor and manage the network. This architecture improves observability, enhances security, and automates retries for failed requests, making it a valuable tool in managing modern software systems.

Figure 4:
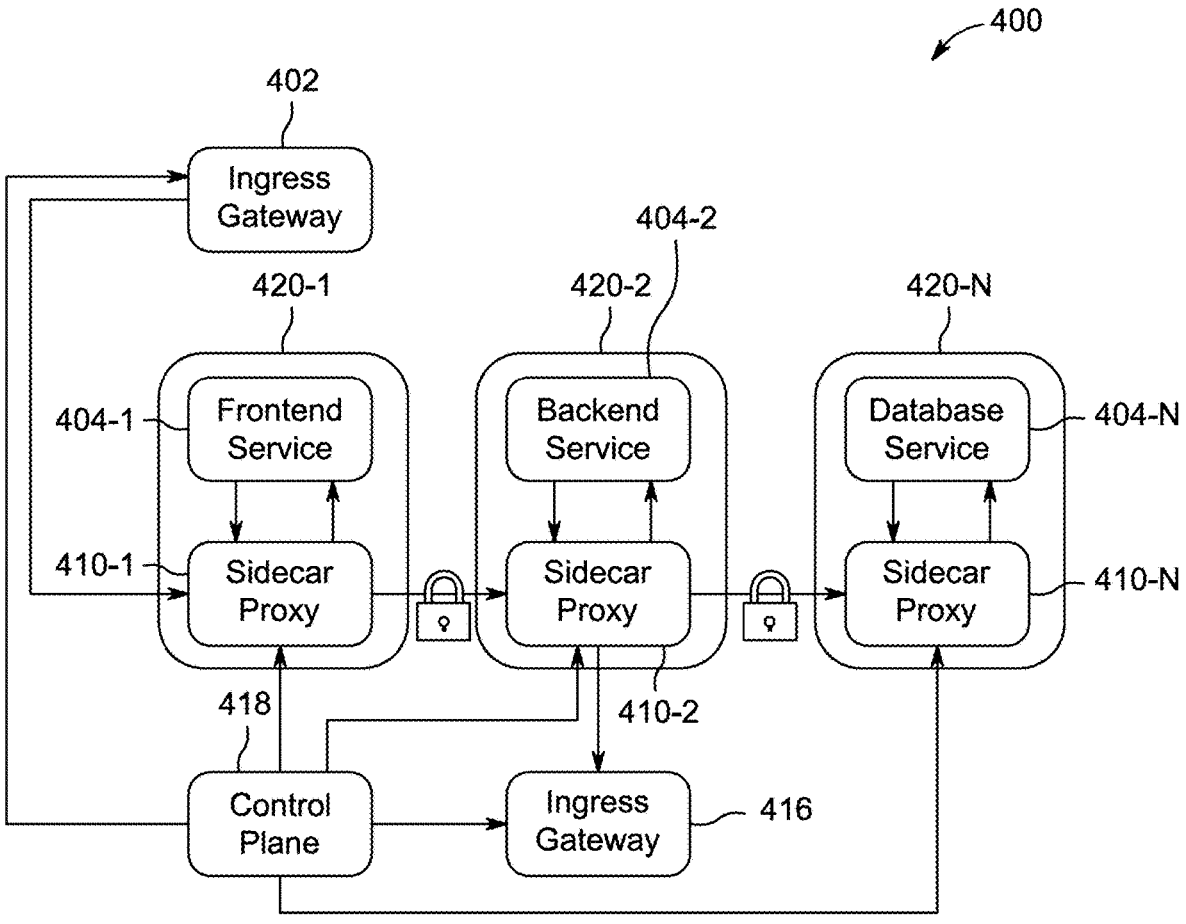
FIG. 4 illustrates an example of a service mesh architecture for communication between services or microservices.

FIG. 4 illustrates a simplified example of a service mesh architecture 400 for facilitating communication between services or microservices. References made herein to a service(s) or microservice(s) should be understood as being interchangeable and inclusive of the one, the other, or both. Service mesh architecture 400 may be a Kubernetes service mesh which is a is a dedicated infrastructure layer for handling service-to-service communication. For example, service mesh architecture 400 may include Kubernetes pods 420 (e.g., 420-1 . . . 420-N) which may comprise one or more containers. Here, each of the microservices 404 (e.g., 404-1 . . . 404-N) or portions of an application within a respective one of the Kubernetes pods 420 of a Kubernetes service mesh. For instance, such microservices may illustratively comprise a frontend service 404-1, a backend service 404-2, a database service 404-n, and any number of other services as needed for a particular application. Overseeing the control plane traffic in the service mesh between such pods may be a service mesh control plane 418, such as Istio or the like.

By default, there is typically no security between microservices 404. However, as shown, optional sidecar proxies, sidecar proxies 410 (e.g., 410-1 . . . 410-N), may be associated with each of the microservices 404. Sidecar proxies 410 may be separate containers running along the application container used for running isolated peripheral tasks such as logging, proxying, configuration management, data security, etc. They may share the same overall lifecycle management as the parent container such that creation/termination events are in sync. The sidecar proxies 410 may be hosted and/or execute within a same one of the Kubernetes pods 420 as the microservice that it supports.

In various implementations, each microservice may be associated with a corresponding sidecar proxy that is also executed within the microservice's Kubernetes pods and which may be used to perform any number of functions with respect to microservice. For instance, sidecar proxies 410 may include lookup functions, firewall functions, security functions, or the like, as is typically done today. In service meshes having a goal of end-to-end encryption, a service mesh may inject a sidecar proxy with a TLS certificate into each pod. Control planes may also come with a certificate authority that rotates the certificates.

With a service mesh, all of the traffic may be routed through ingress (e.g., ingress gateway 402) and egress (e.g., egress gateway 416) through one of the sidecar proxies 410. The sidecar proxies 410 may then add tracing headers to a request. When a request comes through the ingress gateway 402 to the front end that goes to the back end, a trace may be generated for all of those requests without having to instrument code.

Figure 5:
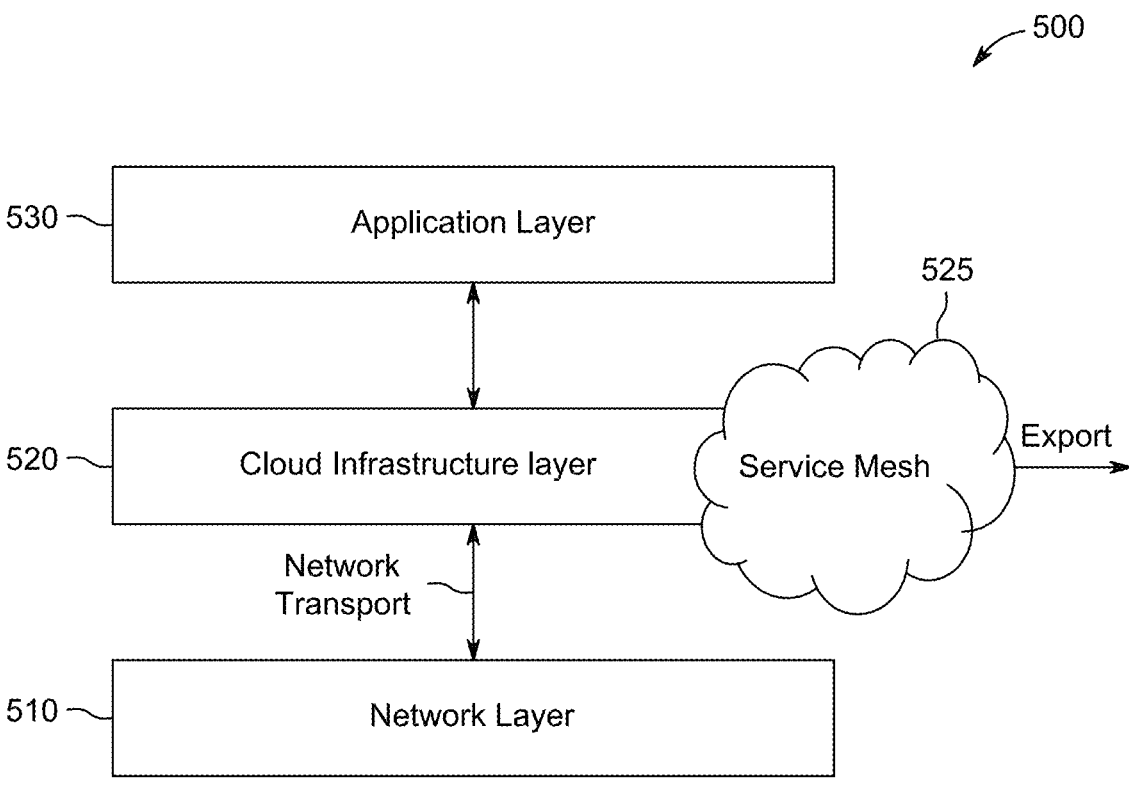
FIG. 5 illustrates a simplified example of an application technology stack showing a network layer, a cloud infrastructure layer, and an application layer.

Additionally, FIG. 5 illustrates a simplified example of an application technology stack 500 showing a network layer 510, a cloud infrastructure layer 520, and an application layer 530. As mentioned above, a service mesh 525 may be overlayed on a cloud infrastructure, such as a Kubernetes infrastructure.

According to the techniques herein, the service mesh 525 may be dynamically programmed to record metrics to effectively bound a problem domain. Such a service mesh may be proxy-based as mentioned above (e.g., using a sidecar model, like Istio) or it can be extended Berkeley Packet Filter (eBPF)-based (like Cilium). In either case, the service mesh can be programmed to not only measure the necessary key performance indicators (KPIs) to effectively delineate problem domains, but it can also be programmed to export this information, such as via telemetry models like Open Telemetry (OTEL), or even by embedding important information directly into packet headers, as will be discussed further below.

To effectively demarcate the problem domain from being either the network, the cloud infrastructure, and the application, the following key questions need to be definitely answered:

Is it a network issue? If so:

Did the issue (e.g., excessive latency and/or packet loss) occur in the network segments between the user and the cloud infrastructure edge?—OR—

Did the issue occur within the application microservice architecture (i.e., the network segments between application microservices/API endpoints, etc.)?

Or, is the issue a cloud infrastructure issue?

If so, is it a software issue with the Kubernetes infrastructure (e.g., unhealthy application or control-plane pods)?

Or is it a node hardware issue (e.g., CPU saturation, memory saturation, etc.)?

Or is it simply a function of high load on the application microservices?

Or, is the issue occurring within the application itself (e.g., slow-responding/non-responding services, high error rates, etc.)?

The techniques herein may start by first answering the network issues questions. Namely, to identify if there is a network issue between the user and the cloud infrastructure edge, a TCP analysis function, such as Cisco IOS Application Response Time (ART), can be programmed to be performed at the ingress of a given cluster.

Figure 6A:
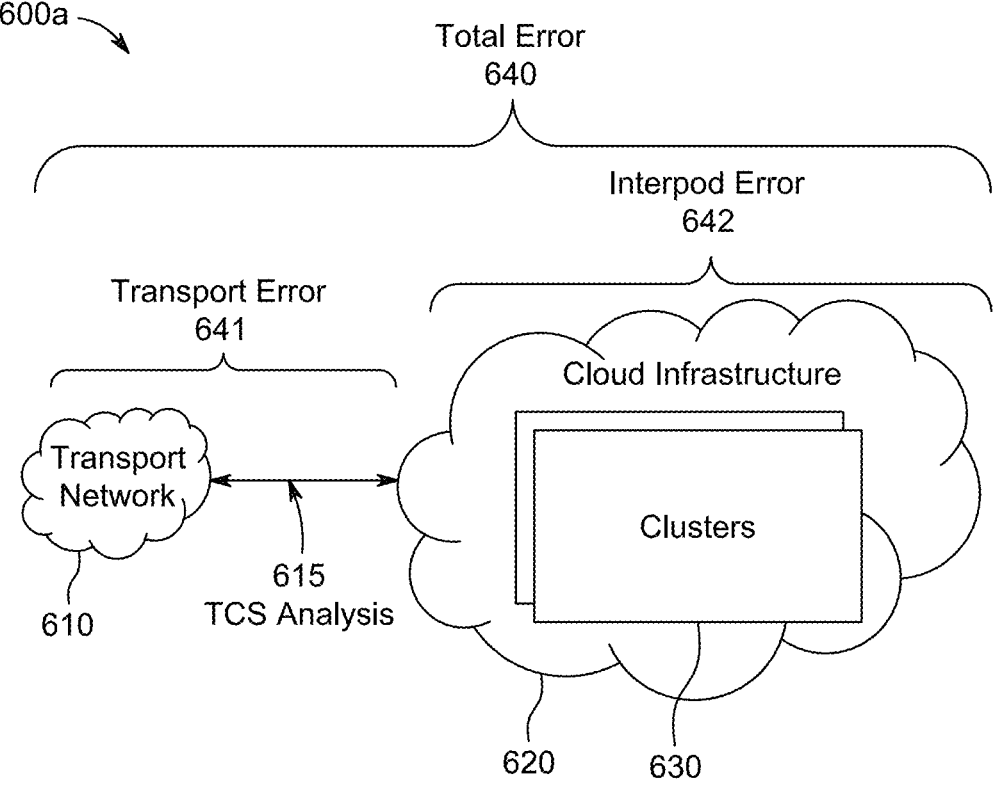
FIGS. 6A-6B illustrate an example environment showing a transport network interconnected with a cloud infrastructure containing a number of clusters and pods.

For instance, with reference generally to FIG. 6A, an environment 600a illustrates a transport network 610 interconnected with a cloud infrastructure 620 containing a number of clusters, clusters 630. The techniques herein are meant to determine the cause of total error 640 (e.g., latency/delay, packet loss, or other errors), and may start by distinguishing between transport error 641 and interpod error 642.

In particular, according to the techniques herein, TCP analysis 615, e.g., ART, can be used to effectively delineate if the issue (total error 640) occurred in the transport to the cluster(s) (transport error 641) or within the cluster(s) (interpod error 642), e.g., based on monitoring SYN, SYNACK, and/or ACK messages and their timestamps. However, it should be noted that ART would generally not be able to tell if an issue occurring within a cluster is due to network, hardware, or application issues (as will be discussed subsequently).

Figure 6B:
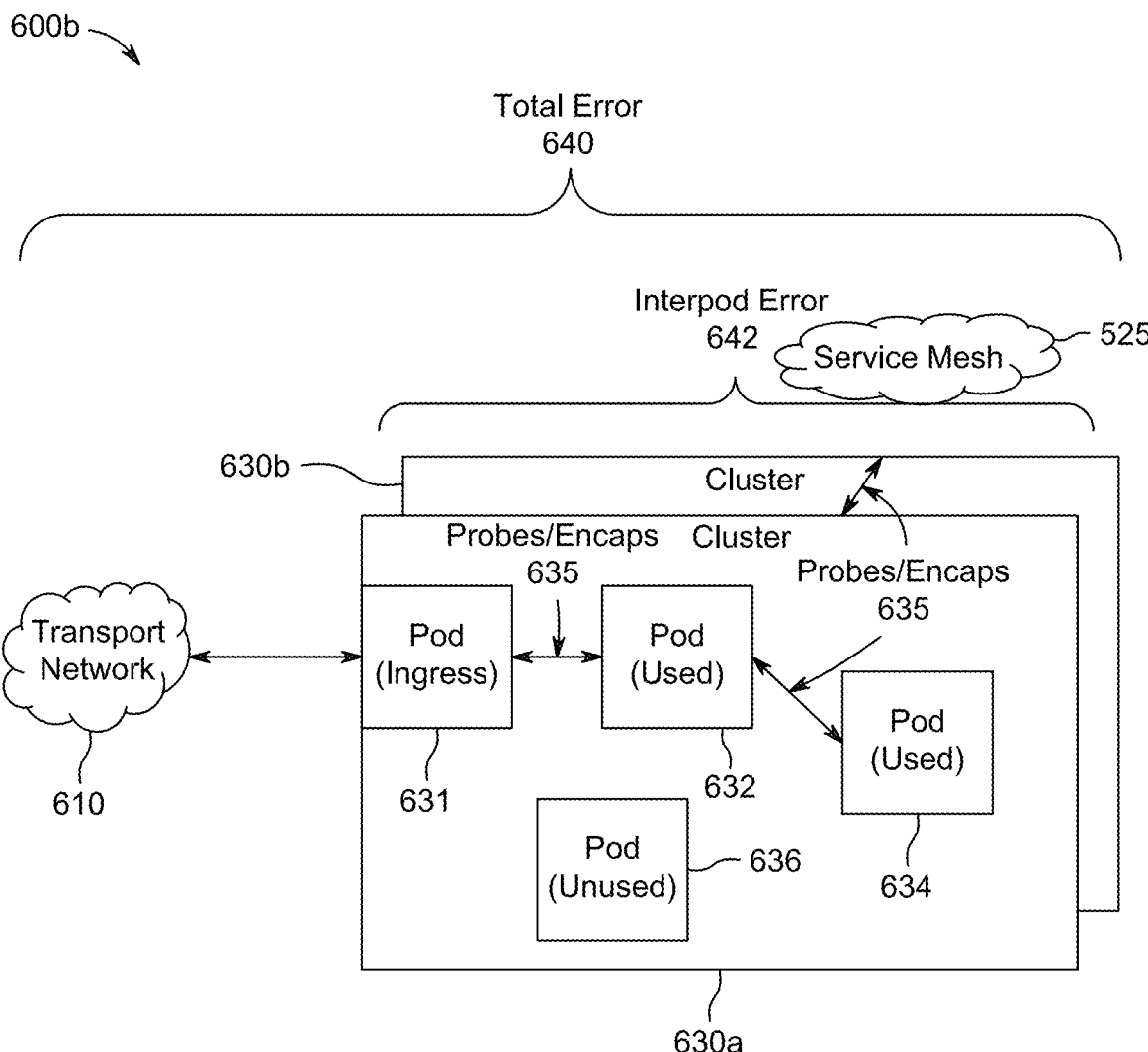

The next question to answer, if it is a network issue, is whether the network issue is occurring within the application microservice infrastructure. Refocused environment 600b of FIG. 6B illustrates a closer view of the clusters 630, namely, cluster 630a and cluster 630b, with intra-cluster and inter-cluster communication shown. By default, a service mesh 525 will generate latency/error metrics for interpod communications (whether these be intra-cluster or inter-cluster). However, the latency/error metrics (interpod error 642) generated by a service mesh cannot delineate the network component of the latency for these interpod communications and the application processing latency. As such, deeper analysis is needed.

According to the techniques herein, if a service mesh detects an error (e.g., high latency, packet drops, etc.) from communications, it can be dynamically programmed to take additional measurements to delineate network vs. application delay within the clusters 630. One way it can do this is to generate synthetic probe traffic between the pods in question. These probes would report the network portions of the delays, which can be compared by the service mesh management plane to the overall latency, thus determining a cluster networking issue or an application issue. Alternatively, for highly time-sensitive flows, the service mesh could also be programmed to encapsulate the interpod traffic into IP Real-time Transport Protocol (RTP) or User Datagram Protocol (UDP) datagrams, which could then be used to measure and report actual (vs. synthetic) cluster networking latency. As shown in FIG. 6B, such probes/encapsulations 635 may resultingly take place between an ingress pod 631 and a number of used pods of the cluster 630a (intracluster) and cluster 630b (inter-cluster), such as pod 632 and pod 634 as shown, but not (optionally) unused pod 636.

The service mesh also measures the health of the pods within the cluster, including control plane pods (such as the Kubernetes API Server and other control plane pods). Additionally, it can monitor pod and node CPU and memory statistics, as well as traffic rates to individual pods. Finally, the service mesh monitors pods responses and error rates.

The service mesh can be programmed to export any and all of these metrics to telemetry receivers, such as Open Telemetry collectors. Open Telemetry or "OTEL" generally refers to a collection of tools, application programming interfaces (APIs), and/or software development kits (SDKs). OTEL may be used to instrument, generate, collect, and/or export telemetry data (e.g., metrics, logs, and traces) that assist in analyzing the performance and behavior of a software system, as well as applications that are executed by the software system.

Figure 7:
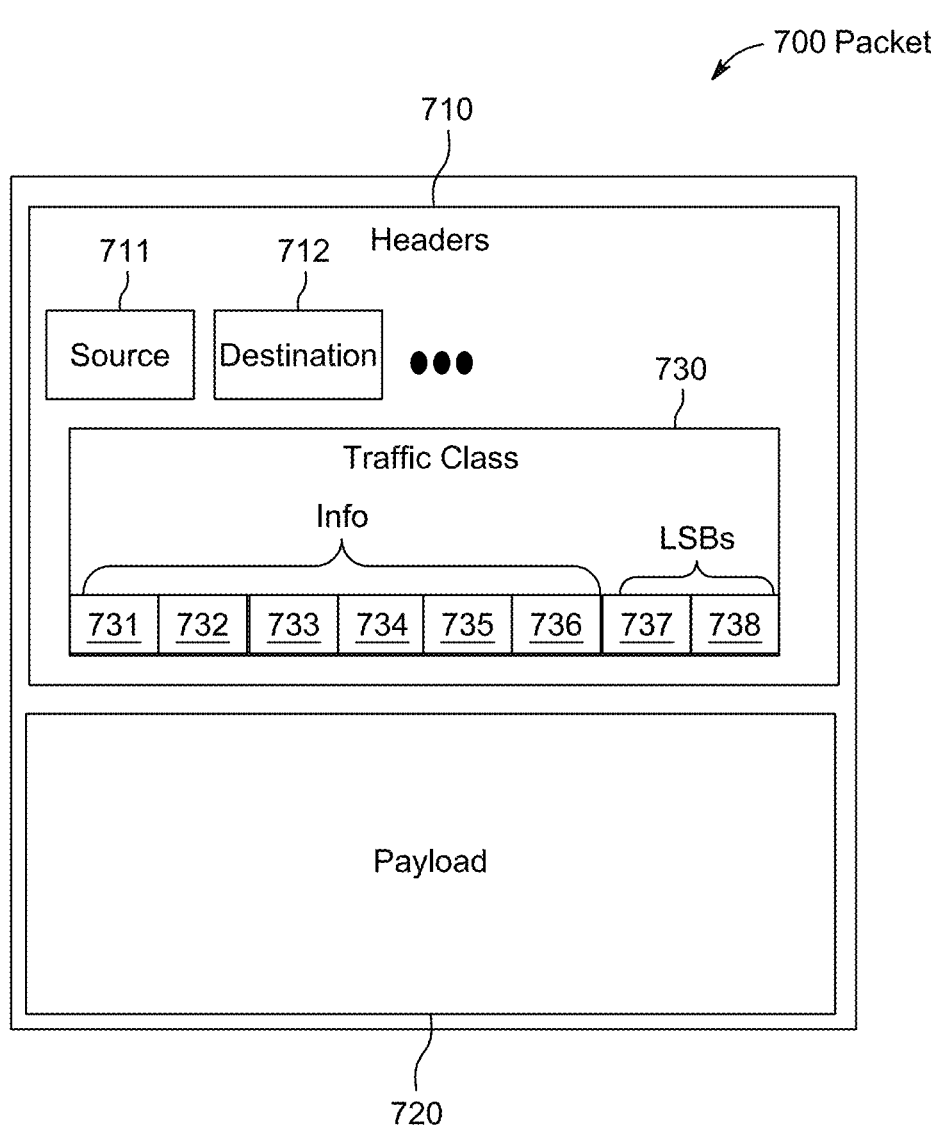
FIG. 7 illustrates a simplified example format of a packet.

However, in another embodiment, the service mesh could also be programmed to provide a tighter correlation to network assurance systems by embedding some of the information it observes directly into packet headers, e.g., of the application traffic. For example, FIG. 7 illustrates a simplified example format of a packet 700 having one or more headers 710 and a payload 720. Within the one or more headers 710 are various fields used to route/forward the packet 700 through the network, such as, illustratively, a source field 711 and a destination field 712. Other fields 715 may be contained within the header(s), and may be used to programmatically indicate the information determined herein, such as by setting variable fields under certain encodings, accordingly.

Additionally, as shown herein, a traffic class field 730 (in IPv6, also referred to as a type of service, or ToS, in IPv4) may also be contained within the headers, and may be repurposed for the sake of the techniques herein. For example, within the cloud infrastructure, the Traffic Class field (or Type of Service Byte) of IPv6/IPv4 packets is rarely (if ever) used, as compute clusters are deployed over local high-speed, high-bandwidth local area networks within cloud providers, where Quality of Service (QoS) mechanisms are rarely (if ever) needed, due to overprovisioning. As such, this traffic class field 730 can be repurposed to greater use by capturing key insights that the service mesh has provided.

Before discussing how the traffic class field can be used to capture metrics generated by the service mesh, it should be noted that the network devices would need to know whether the information in this field contains familiar QoS markings (as defined by Differentiated Services standards) or is being repurposed for enhanced service mesh generated information. One effective way this can be signaled to the network is to take advantage of a logical contradiction within the IP Explicit Congestion Notification (IP ECN) standard (RFC 3168).

IP ECN uses the two least significant (i.e., the right-most) bits (LSBs), bit 7 (737) and bit 8 (738), of the traffic class field 730 in the IPv4 or IPv6 header such that:

Bit 7 (737): ECN-Capable (ECN bit):
   a value of 0 indicates the device is NOT IP ECN capable;
   a value of 1 indicates the device is IP ECN capable.
Bit 8 (738): Congestion Experienced (CE) bit:
   A value of 0 indicates the packet did NOT experience congestion;
   A value of 1 indicates the packet experienced congestion.

As such, a logical contradiction is presented if these bits are set to "01", meaning that:

The device is NOT IP ECN capable, but yet:
The packet has experienced congestion (which should not be possible to record or preserve if the device is not IP ECN capable).

Thus, setting the last two bits of the traffic class field 730 (or ToS byte) to this logically-contradictory value (of 01), i.e., an "ECN 01 paradox", could serve to indicate to the network devices that the information in the preceding six bits of this Traffic Class field (i.e. the Differentiated Services field) has been repurposed. In this context, this repurposing would be to embed critical insights about the application's experience as generated from the service mesh in accordance with the techniques herein.

For example, these six bits could be used to such that:
Bit 1 (731): Cloud Infrastructure Network Delay—if high levels of network delay have been measured by the service mesh then this bit can be flipped accordingly;
Bit 2 (732): Cloud Infrastructure Network Loss—if high levels of network loss have been measured by the service mesh then this bit can be flipped accordingly;
Bit 3 (733): Cloud Infrastructure Hardware Errors—if high levels CPU or memory saturation (or other hardware-related errors) have been measured by the service mesh then this bit can be flipped accordingly;
Bit 4 (734): Application Delay—if high levels of application delay have been measured by the service mesh then this bit can be flipped accordingly;
Bit 5 (735): Application Errors—if high levels of application errors have been measured by the service mesh then this bit can be flipped accordingly; and
Bit 6 (736): High-Traffic Rates—if high levels of traffic have been measured by the service mesh then this bit can be flipped accordingly.

Of course, these are just example uses and can vary according the KPIs most relevant to the operators. Alternatively, rather than each bit representing a different indication, the six bits could be used to indicate up to sixty four (64) different possible notifications using binary coding. The point is that the traffic class field 730 of IPv4 and IPv6 packet headers can be repurposed herein to include details of the application experience, as measured by the service mesh.

As such, rather than restricting these insights to the service mesh, they can be shared with the across domains. For example, by being embedded directly into packet headers, this information can be exported on a first network device (e.g., via Flexible NetFlow by Cisco Systems, Inc.) to network telemetry collectors/network assurance platforms. At this point, the Traffic Class field repurposing will no longer be needed and it can resume its regular function by storing Differentiated Services Code Point (DSCP) markings as imposed by the network edge device.

The net result is that now, for example, when analysts (e.g., IT operators) or other analytic processes analyze aggregate information stored in the time-series databases on the management platforms for these respective network, cloud infrastructure, and application domains, they will be able to see cross-domain metrics for packets of the flow, which helps them effectively delineate whether application experience issues were due to network, cloud infrastructure, or application issues.

According to one or more embodiments of the present disclosure, therefore, the techniques herein delineate whether network issues occurred in the transport to the cluster or within it, e.g., via Application Response Time monitoring at the Kubernetes cluster ingress. Additionally, the techniques herein may intelligently and dynamically delineate application vs. network latency/errors within a cluster via synthetic probes or via RTP encapsulation (for measurements on actual traffic). Furthermore, the techniques herein may also dynamically signal network devices of cloud infrastructure delay and loss, application delay and errors, hardware errors, and high-traffic rates, via OTEL messages or in-band metadata without requiring any new protocol support.

Figure 8:
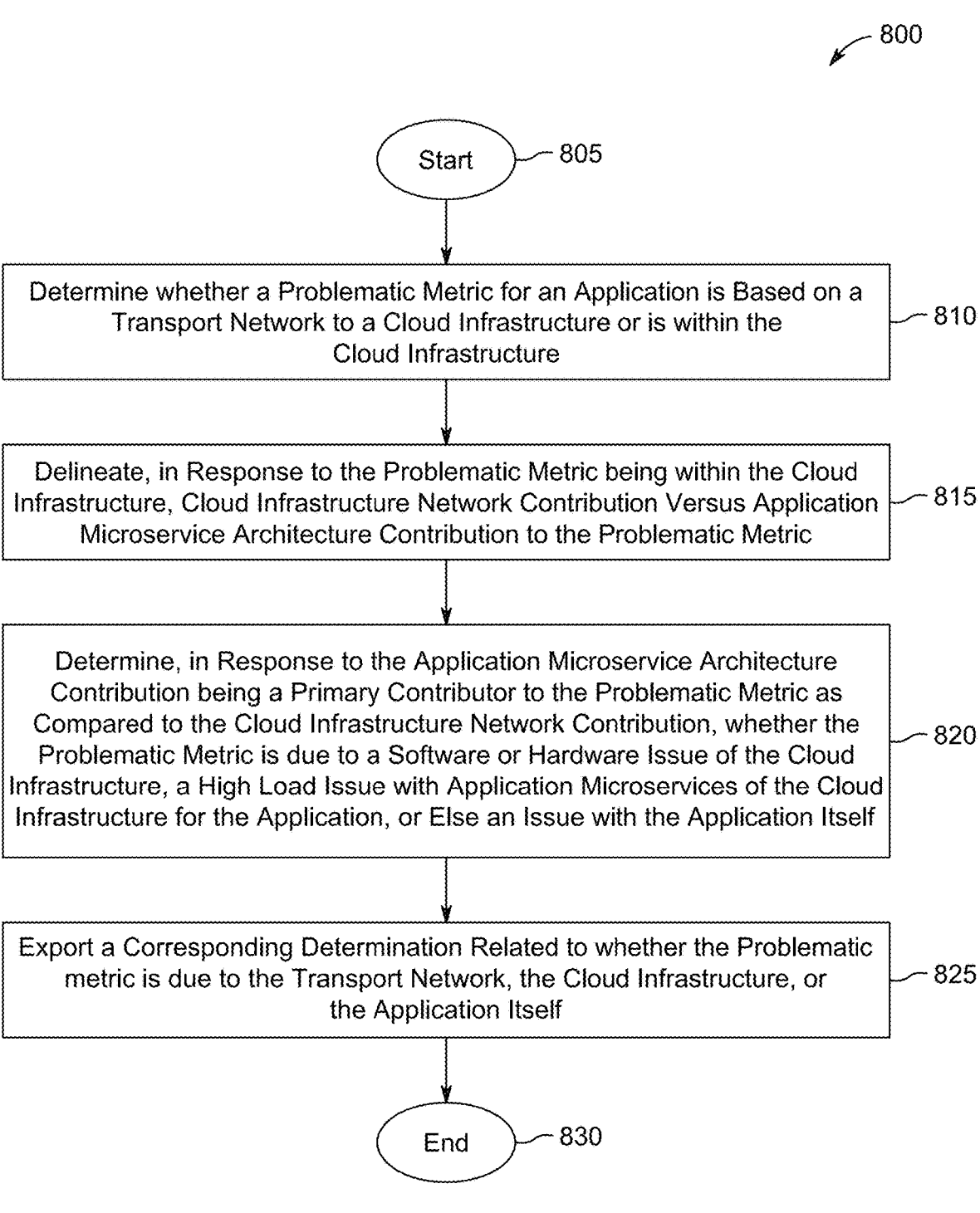
FIG. 8 illustrates an example procedure for full-stack application experience domain troubleshooting.

In closing, FIG. 8 illustrates an example simplified procedure for full-stack application experience domain troubleshooting in accordance with one or more embodiments described herein, particularly from the perspective of a service mesh or other monitoring and reporting process/device (e.g., where the service mesh process is one of either proxy based or extended Berkeley Packet Filter based, as noted above). For example, a non-generic, specifically configured device (e.g., device 200, an apparatus) may perform procedure 800 by executing stored instructions (e.g., process 248). The procedure 800 may start at step 805, and continues to step 810, where, as described in greater detail above, a service mesh process determines whether a problematic metric (latency, delay, packet loss, hardware errors, etc.) for an application is based on a transport network to a cloud infrastructure or is within the cloud infrastructure. For instance, as noted above, this may be based on measuring for the problematic metric on the transport network between a user device and a given cluster within the cloud infrastructure to determine whether the problematic metric for the application is based on the transport network. In one embodiment, measuring is based on an application response time (ART) measurement, but others are possible.

In step 815, the service mesh process may delineate, in response to the problematic metric for the application being within the cloud infrastructure, cloud infrastructure network contribution (based on one or more of network segments between application resources or application programming interface endpoints) versus application microservice architecture contribution to the problematic metric. For instance, as described herein, this may be based on determining a total metric corresponding to the problematic metric within the cloud infrastructure; measuring a cloud infrastructure network metric; and delineating the cloud infrastructure network contribution versus application microservice architecture contribution to the problematic metric based on a share of the cloud infrastructure network metric of the total metric. Notably, in one embodiment, measuring the cloud infrastructure network metric may comprise dynamically activating synthetic probe traffic between pods of the cloud infrastructure that are executing the application. In another embodiment, measuring the cloud infrastructure network metric may comprise dynamically activating encapsulation of actual interpod traffic for the application into datagrams with timestamps used for measuring the cloud infrastructure network metric.

In step 820, the service mesh process may further determine, in response to the application microservice architecture contribution being a primary contributor to the problematic metric as compared to the cloud infrastructure network contribution, whether the problematic metric is due to a software issue of the cloud infrastructure (e.g., unhealthy application pods, unhealthy control plane pods, etc.), a hardware issue of the cloud infrastructure (e.g., CPU saturation, memory saturation, etc.), a high load issue with application microservices of the cloud infrastructure for the application, or else an issue with the application itself (e.g., selected from a group consisting of: slow response time, non-responsive services, high or unacceptable error rates, etc.) Notably, as described in greater detail above, this may be based on one or more of: measuring health and performance of application pods and control plane pods; determining CPU and memory utilization; determining traffic rates per pod the application pods and the control plane pods; and determining, for the application pods and the control plane pods, pod responses and error rates.

In step 825 the service mesh process may then export a "corresponding determination" related to whether the problematic metric is due to the transport network, the cloud infrastructure, or the application itself (i.e., where the "corresponding determination", or finding of cause, is based on steps 810-820 above). In one embodiment as mentioned above, exporting is based on sending the corresponding determination in an open telemetry message to a collector. In another embodiment mentioned above, exporting is based on embedding the corresponding determination in packet headers of application traffic (e.g., repurposing a traffic class field through a logically contradictory setting within the traffic class field to indicate that the traffic class field carries the corresponding determination, where remaining bits of the traffic class field carry the corresponding determination).

Procedure 800 may end at step 830.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

The techniques described herein, therefore, provide for full-stack application experience domain troubleshooting. In particular, the techniques herein may alleviate so-called "finger pointing" between the network, cloud infrastructure, and application, but specifically delineating the cause of any mal-performing metrics for an application, with the cloud infrastructure poised in the middle (touching both the transport network and the application resources) to be able to assess the situation and share information across the tech stacks, accordingly. While other techniques are known to use APIs to correlate observation-derived insights with network telemetry, or else to correlate network flows with specific application transactions or discrete application microservices, no techniques today provide a method to demarcate application experience issues to the relevant network, cloud infrastructure, and application domains, as do the techniques described in greater detail above.

Illustratively, the techniques described herein may be performed by hardware, software, and/or firmware, (e.g., an "apparatus") such as in accordance with the service mesh monitoring process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: determining whether a problematic metric for an application is based on a transport network to a cloud infrastructure or is within the cloud infrastructure; delineating, in response to the problematic metric for the application being within the cloud infrastructure, cloud infrastructure network contribution versus application microservice architecture contribution to the problematic metric; determining, in response to the application microservice architecture contribution being a primary contributor to the problematic metric as compared to the cloud infrastructure network contribution, whether the problematic metric is due to a software issue of the cloud infrastructure, a hardware issue of the cloud infrastructure, a high load issue with application microservices of the cloud infrastructure for the application, or else an issue with the application itself; and exporting a corresponding determination related to whether the problematic metric is due to the transport network, the cloud infrastructure, or the application itself.

In still other implementations, a tangible, non-transitory, computer-readable medium storing program instructions that cause a device to execute a process comprising: determining, as a service mesh process, whether a problematic metric for an application is based on a transport network to a cloud infrastructure or is within the cloud infrastructure; delineating, in response to the problematic metric for the application being within the cloud infrastructure, cloud infrastructure network contribution versus application microservice architecture contribution to the problematic metric; determining, in response to the application microservice architecture contribution being a primary contributor to the problematic metric as compared to the cloud infrastructure network contribution, whether the problematic metric is due to a software issue of the cloud infrastructure, a hardware issue of the cloud infrastructure, a high load issue with application microservices of the cloud infrastructure for the application, or else an issue with the application itself; and exporting a corresponding determination related to whether the problematic metric is due to the transport network, the cloud infrastructure, or the application itself.

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

As used herein, the terms "application" and "applications" generally refer to a computer program or computer programs that are designed to carry out a specific task or tasks other than task(s) relating to the operation of the computer itself. In particular, an "application" can refer to a collection of executable computer code that is provided to, or is integrated into, a software system. As a result, the "application" or "applications" discussed herein can refer to any collection computer code that is executed by, or provided by, the software system.

By way of example, the applications mentioned herein can be host applications that run on various computing systems, such as a physical computer (e.g., a desktop, a laptop, a smartphone, a tablet, a phablet, etc.), a virtual computer (e.g., a thin client, a virtual machine, a Linux container, etc.), a data center (e.g., rack server, supercomputer, etc.), and/or a software defined data center (e.g., bare metal server), etc. Accordingly, the applications described herein can be locally provided host applications, virtually provided host applications, and so on and so forth.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:
   determining, by a service mesh process, whether a problematic metric for an application is based on a transport network to a cloud infrastructure or is within the cloud infrastructure;
   delineating, by the service mesh process and in response to the problematic metric for the application being within the cloud infrastructure, cloud infrastructure network contribution versus application microservice architecture contribution to the problematic metric;
   determining, by the service mesh process and in response to the application microservice architecture contribution being a primary contributor to the problematic metric as compared to the cloud infrastructure network contribution, whether the problematic metric is due to a software issue of the cloud infrastructure, a hardware issue of the cloud infrastructure, a high load issue with application microservices of the cloud infrastructure for the application, or else an issue with the application itself; and
   exporting, by the service mesh process, a corresponding determination related to whether the problematic metric is due to the transport network, the cloud infrastructure, or the application itself.

2. The method of claim 1, further comprising:
   measuring for the problematic metric on the transport network between a user device and a given cluster within the cloud infrastructure to determine whether the problematic metric for the application is based on the transport network.

3. The method of claim 2, wherein measuring is based on an application response time measurement.

4. The method of claim 1, further comprising:
   determining a total metric corresponding to the problematic metric within the cloud infrastructure;
   measuring a cloud infrastructure network metric; and
   delineating the cloud infrastructure network contribution versus application microservice architecture contribution to the problematic metric based on a share of the cloud infrastructure network metric of the total metric.

5. The method of claim 4, wherein measuring the cloud infrastructure network metric comprises:

dynamically activating synthetic probe traffic between pods of the cloud infrastructure that are executing the application.

6. The method of claim 4, wherein measuring the cloud infrastructure network metric comprises:
   dynamically activating encapsulation of actual interpod traffic for the application into datagrams with timestamps used for measuring the cloud infrastructure network metric.

7. The method of claim 1, further comprising, in response to the application microservice architecture contribution being the primary contributor to the problematic metric as compared to the cloud infrastructure network contribution:
   measuring health and performance of application pods and control plane pods;
   determining CPU and memory utilization;
   determining traffic rates per pod the application pods and the control plane pods; and
   determining, for the application pods and the control plane pods, pod responses and error rates.

8. The method of claim 1, wherein the service mesh process is one of either proxy based or extended Berkeley Packet Filter based.

9. The method of claim 1, wherein exporting comprises:
   sending the corresponding determination in an open telemetry message to a collector.

10. The method of claim 1, wherein exporting comprises:
    embedding the corresponding determination in packet headers of application traffic.

11. The method of claim 10, further comprising:
    repurposing a traffic class field through a logically contradictory setting within the traffic class field to indicate that the traffic class field carries the corresponding determination, wherein remaining bits of the traffic class field carry the corresponding determination.

12. The method of claim 1, wherein the problematic metric is selected from a group consisting of: latency; delay; packet loss; and hardware errors.

13. The method of claim 1, wherein the issue with the application itself is selected from a group comprising: slow response time; non-responsive services; and unacceptable error rates.

14. The method of claim 1, wherein the hardware issue of the cloud infrastructure is selected from a group consisting of: CPU saturation; and memory saturation.

15. The method of claim 1, wherein the software issue of the cloud infrastructure is selected from a group consisting of: unhealthy application pods; and unhealthy control plane pods.

16. The method of claim 1, cloud infrastructure network contribution is based on one or more of network segments between application resources or application programming interface endpoints.

17. A tangible, non-transitory, computer-readable medium storing program instructions that cause a device to execute a process comprising:
    determining, as a service mesh process, whether a problematic metric for an application is based on a transport network to a cloud infrastructure or is within the cloud infrastructure;
    delineating, in response to the problematic metric for the application being within the cloud infrastructure, cloud infrastructure network contribution versus application microservice architecture contribution to the problematic metric;
    determining, in response to the application microservice architecture contribution being a primary contributor to the problematic metric as compared to the cloud infrastructure network contribution, whether the problematic metric is due to a software issue of the cloud infrastructure, a hardware issue of the cloud infrastructure, a high load issue with application microservices of the cloud infrastructure for the application, or else an issue with the application itself; and exporting a corresponding determination related to whether the problematic metric is due to the transport network, the cloud infrastructure, or the application itself.

18. The tangible, non-transitory, computer-readable medium of claim 17, wherein the process further comprises:

measuring for the problematic metric on the transport network between a user device and a given cluster within the cloud infrastructure to determine whether the problematic metric for the application is based on the transport network.

19. The tangible, non-transitory, computer-readable medium of claim 17, wherein the process further comprises:

determining a total metric corresponding to the problematic metric within the cloud infrastructure;

measuring a cloud infrastructure network metric; and delineating the cloud infrastructure network contribution versus application microservice architecture contribution to the problematic metric based on a share of the cloud infrastructure network metric of the total metric.

20. An apparatus, comprising:

one or more network interfaces to communicate with a network;

a processor coupled to the one or more network interfaces and configured to execute one or more processes; and a memory configured to store a process that is executable by the processor, the process comprising:

determining whether a problematic metric for an application is based on a transport network to a cloud infrastructure or is within the cloud infrastructure;

delineating, in response to the problematic metric for the application being within the cloud infrastructure, cloud infrastructure network contribution versus application microservice architecture contribution to the problematic metric;

determining, in response to the application microservice architecture contribution being a primary contributor to the problematic metric as compared to the cloud infrastructure network contribution, whether the problematic metric is due to a software issue of the cloud infrastructure, a hardware issue of the cloud infrastructure, a high load issue with application microservices of the cloud infrastructure for the application, or else an issue with the application itself; and exporting a corresponding determination related to whether the problematic metric is due to the transport network, the cloud infrastructure, or the application itself.

* * * * *